United States Patent Office 3,496,646
Patented Feb. 24, 1970

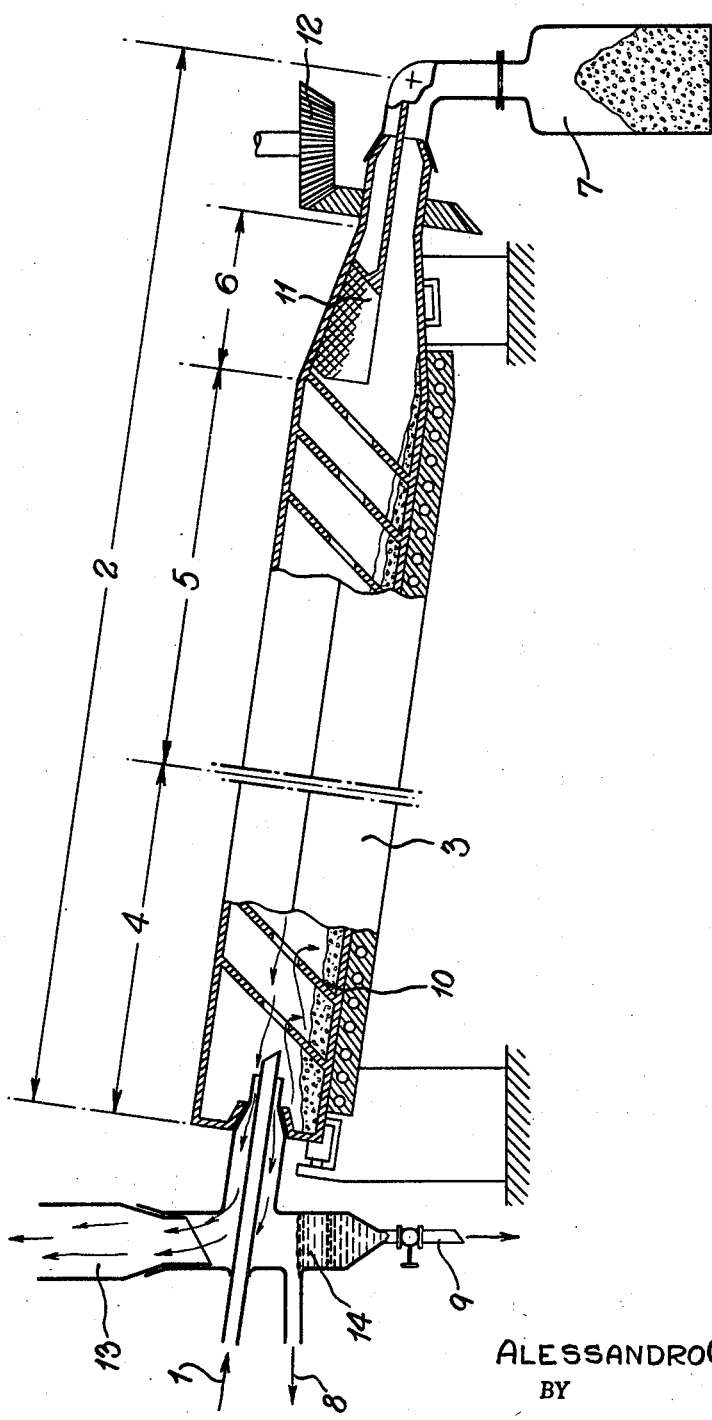

3,496,646
PROCESS AND APPARATUS FOR CONTINUOUSLY DRYING GRANULAR MATERIAL
Alessandro G. Facchini, San Donato, Milanese, Milano, Italy, assignor to Snam Progetti S.p.A., Milan, Italy
Filed Jan. 31, 1967, Ser. No. 612,987
Claims priority, application Italy, Jan. 31, 1966, 13,978/66
Int. Cl. F26b 3/04, 17/20
U.S. Cl. 34—9                                    7 Claims

ABSTRACT OF THE DISCLOSURE

Wet granular material is dried by mixing it with a liquid with which it is immiscible but forms an azeotropic mixture; conveying the mixture through heated apparatus having zones for (1) distillation with reflux, (2) distillation without reflux, and (3) drying; and withdrawing vapors from the apparatus in a direction countercurrent to the travel of the granular material.

BACKGROUND OF THE INVENTION

It is known that water can be removed from solid material by distillation in the presence of a liquid which is immiscible with water but which forms with water an azeotropic mixture or, at any rate, a mixture having a minimum boiling point. In the past, this has been carried out as a batch process. Prior to my invention, no process or apparatus of the above-mentioned kind was known which was suitable for effecting the continuous removal of water from solid material. The problem of drying solid material as a continuous process is particularly important in industries wherein granular, friable and crumbly materials are handled.

I have discovered that it is possible to dry such solid materials as a continuous process wherein the drying temperature is accurately controlled, over-heating of materials to be dried is avoided and the water removal takes place gradually without causing cracks or fissures in the material.

It is a particular feature of my invention that my new process can be practiced with advantage in drying hydroxides or oxides, or mixtures thereof, of Al, Fe, Mg, Be, Cr, Ce, Zr, etc., for the production of spheroids and the like to be employed as catalysts or as catalyst carriers. Another important field that can be benefited through the practice of my invention is in the drying of materials such as Th, U, Pu in the production of spheroidal fuels for nuclear purposes, prepared according to the disclosure set forth in copending U.S. patent application, Ser. No. 577,190, filed Sept. 6, 1966, to which reference is made by permission. In the preparation of nuclear fuels, a very important advantage attending the practice of my invention arises from the fact that the dried material thus obtained exhibits a high porosity together with a low density as compared with the fuels which are obtainable with conventional drying processes (air drying, etc.). The high porosity permits a subsequent thermal treatment (baking) without giving any severe breakage (owing to the evolution of gas from the interior of the spheres) and, on the other hand, after baking the density of the spheres is very high.

SUMMARY

In the practice of my invention, the wet granular material to be treated is first dispersed in a liquid dispersion medium which is immiscible with the wetting liquid but is capable of forming with it a mixture showing a minimum boiling point and which is a true azeotropic mixture or a "pseudo-azeotropic" mixture, referred to in the following specification and claims as "azeotropic mixture." The dispersion is fed to a drying chamber so that the granular material passes therethrough as a continuous process. In the drying chamber, the dispersion is subjected to distillation with reflux in a first zone so that the major portion of the wetting liquid is there removed. In a second zone, the balance of the dispersion is subjected to distillation without reflux so that substantially all of the wetting liquid and excess dispersion medium are there removed. Residual liquid is removed from the granular material in a third zone in the drying chamber. Dry granular material is then withdrawn from the chamber and vapors are withdrawn in a direction counter to the direction of flow of granular material through the chamber.

In the practice of my process, it is possible in the first step to operate at a low temperature (near the boiling point of the azeotropic mixture), removing the major portion of the water present in the material; while, in the second step, the residual water is removed together with the excess of dispersion medium which, being selected from materials which are incompatible with the material to be dried, can be removed without giving rise to cracks or causing other damage to the solid material under treatment.

The apparatus that I use in the practice of my invention comprises an elongated inclined drying chamber having an inlet opening at its upper end and an outlet opening at its lower end. The material to be dried is supplied to the interior of the drying chamber through a duct leading to the inlet opening. The drying chamber is equipped with a heat exchanger adapted to connect intercommunicating zones in the drying chamber. Those zones include a first distillation zone communicating with the inlet opening, a drying zone communicating with the outlet opening, and a second distillation zone located between the first distillation zone and the drying zone. Means are provided for moving the material to be dried through those zones successively, and means are provided for withdrawing vapor from the drying chamber in a direction which is counter to the direction of movement of the granular material through the drying chamber. Such apparatus is illustrated schematically in the accompanying drawing.

BRIEF DESCRIPTION OF THE DRAWING

The drawing is a side elevation, broken away in part, of the apparatus that I now prefer to employ in the practice of my invention.

DESCRIPTION OF THE PREFERRED EMBODIMENT

The apparatus illustrated consists substantially of a duct 1 for feeding the solid particles to be dried together with the water immiscible liquid. The mixture is fed to a rotating inclined hollow screw conveyor 2 provided with a heating jacket 3. The first zone 4 of said conveyor screw allows the azeotropic distillation of the mixture (water-water immiscible dispersion medium) with a dispersion medium reflux; in the second zone 5 a distillation of dispersion medium and water without reflux takes place and then in the terminal zone 6 there is a complete drying of granular material which is thereafter discharged and collected in a reservoir 7, 8 is an overflow for recovering the dispersion medium to be recycled, 9 is a discharging device for the imbibition liquid (generally water), 10 is the thread of the conveyor screw, 11 is a device for scraping the dried material, 12 represents the conveyor screw rotating means. In order to avoid condensations into the reservoir 7, suitable heating means or metering valve for discharging the dried material may be provided.

The final removal of dispersion medium may be carried out also by resorting to other conventional methods, e.g., iltration, decantation, etc. The azeotropic mixture condensed in 13 is collected in 14 wherein two different phases are separated and the recovered immiscible dispersion medium is recycled after being dehydrated if necessary.

My improved drying process is of general application. It may be employed for removing polar impregnating liquid as well as non-polar types, and to any kind of material to be dried. However, it will be appreciated by those skilled in the art that, to obtain the advantages inherent in the present invention, it is necessary to take into account some critical features. The following are very important: the kind of the material to be dried, the dispersion medium that is employed, the screw conveyor rotating rate, the screw conveyor pitch, the screw conveyor axis inclination which determines a different capacity of the screw conveyor threads and the heating profile obtained by the heating means. Those critical features are related to the possibility of obtaining optimum operative conditions in order to prepare perfectly dried solid particles without showing any fissure or physical modifications which may compromise the mechanical strength and ability of undergoing further treatments which are often very severe (e.g., very high temperatures, thermal shock, etc.).

The dispersion medium is preferably selected from aliphatic, aromatic and cyclo-aliphatic hydrocarbons having a boiling point between 60° C. and 180° C. and capable of forming with water azeotropic mixtures having a boiling point between 60° C. and 99° C. Hydrocarbons adapted to form azeotropic mixtures with a larger amount of water are preferred, provided that the boiling point of said mixtures is higher than the minimum of the aforesaid range in order to carry out the drying operation in reasonable times and they are convenient from an industrial point of view.

Once the feed has been determined (i.e., practically the amount of solid material and the amount of dispersion medium), it is possible to state the best values of the screw conveyor rotating rate, the screw conveyor thread and the heating profile together with the other critical features. Said features have to be selected in order to obtain in the first zone of the screw conveyor a distillation with reflux.

Broadly speaking, in said first zone a removal of the immiscible dispersion medium-water azeotropic mixture takes place and in the same time the condensed dispersion medium flowing back into the screw conveyor practically produces a reflux. Thereafter the materials pass downward from a thread to the subsequent threads and reach the second distillation (without reflux) zone and finally the third zone wherein the material is only dried.

In order that my invention will be fully available to those skilled in the art, the following example is given:

EXAMPLE

A screw conveyor having an external diameter of 80 mm., a length of 1300 mm., a thread pitch of 53 mm., the thread being provided with a hole of 20 mm., maximum capacity of said thread when the screw conveyor is in a flat position of 90 ml. and 62 ml. when the screw conveyor is inclined of about 25°, rotating rate 0.8 r.p.m., thermal power 20–40 w./cm., was fed with a 160 ml./min. suspension obtained from an apparent volume of 50 ml. of wet spherules of thorium hydroxide (2 mm. diameter) corresponding to a true volume of 33 ml., the remainder being xylene.

The water content of the spherules was 29 ml.

In normal rating conditions, 850 mm. of the screw conveyor, corresponding to 16 threads, worked as a distilling apparatus under reflux and the other nine worked as a distilling apparatus without reflux and as a drying apparatus.

The spherules collected at the screw conveyor outlet contained only traces of water and had a density of 2.5 gr./ml. After packing they have a density of 9.8 gr./ml. The same material dried in a conventional manner (i.e., air dried) had a density of 4.2 gr./ml.

What I claim is:
1. The process of drying granular material which is wet with a liquid, and which comprises:
  dispersing the wet material in a liquid dispersion medium which is immiscible with the wetting liquid and forms an azeotropic mixture therewith;
  continuously feeding said dispersion to a drying chamber so that the granular material flows therethrough;
  subjecting said dispersion to distillation with reflux in a first zone in said chamber so that the major portion of said wetting liquid is removed;
  subjecting the balance of said dispersion to distillation without reflux in a second zone in said chamber so that substantially all of the wetting liquid and excess dispersion medium are removed;
  removing residual liquid from the granular material in a third zone in said chamber;
  withdrawing dry granular material from said chamber; and
  withdrawing vapors from said chamber in a direction counter to the direction of flow of granular material through said chamber.

2. The process according to claim 1 wherein the wetting liquid is water.

3. The process according to claim 2 wherein the water immiscible dispersion medium has a boiling point between 60° C. and 180° C. and is adapted to form with water an azeotropic mixture having a boiling point between 60° C. and 90° C.

4. The process according to claim 1 wherein the granular material is selected from the group consisting of the hydroxides and oxides of thorium, uranium, plutonium, beryllium, aluminum, magnesium, iron, chromium, zirconium, cerium and mixtures thereof.

5. The process according to claim 1 wherein the granular material is selected from the group consisting of thorium and uranium and has a dry density between 2 and 3 gr./ml. and is of high porosity.

6. Apparatus for continuously drying wet granular material comprising:
  an elongated inclined drying chamber having an inlet opening at its upper end and an outlet opening at its lower end;
  a duct adapted to supply material to be dried to the interior of the drying chamber through said inlet opening;
  a heat exchanger adapted to create, within said drying chamber, intercommunicating zones including a first distillation zone communicating with said inlet opening, a drying zone communicating with said outlet opening and a second distillation zone located between said first distillation zone and said drying zone;
  conveying means adapted to move said material through said zones successively; and
  means for withdrawing vapors from said drying chamber in a direction counter to the direction of movement of said material through said chamber.

7. Apparatus according to claim 6 wherein the conveying means is a rotating screw conveyor.

References Cited

UNITED STATES PATENTS

| 2,503,913 | 4/1950 | Kimberlin et al. | 34—9 |
| 2,571,143 | 10/1951 | Leslie | 34—74 X |
| 2,637,119 | 5/1953 | Germain | 34—9 |
| 3,290,790 | 12/1966 | Kunii et al. | 34—9 |

JOHN J. CAMBY, Primary Examiner

U.S. Cl. X.R.

34—73